(12) United States Patent
Manke (10) Patent No.: US 9,644,621 B2
(45) Date of Patent: May 9, 2017

(54) BEARING ARRANGEMENT FOR A RECIPROCATING COMPRESSOR (75) Inventor: Adilson Luiz Manke, Joinville-Sc (BR)

(73) Assignee: Whirlpool S.A., São Paulo-Sp (BR)

( * ) Notice: Subject to any disclaimer, the term of this patent is extended or adjusted under 35 U.S.C. 154(b) by 339 days.

(21) Appl. No.: 13/978,999

(22) PCT Filed: Dec. 23, 2011

(86) PCT No.: PCT/BR2011/000505
§ 371 (c)(1),
(2), (4) Date: Aug. 20, 2013

(87) PCT Pub. No.: WO2012/094715
PCT Pub. Date: Jul. 19, 2012

(65) Prior Publication Data
US 2013/0323030 A1 Dec. 5, 2013

(30) Foreign Application Priority Data
Jan. 13, 2011 (BR) .................... 1100652

(51) Int. Cl.
F04B 39/00 (2006.01)
F16C 3/14 (2006.01)
(Continued)

(52) U.S. Cl.
CPC ............ F04B 39/0094 (2013.01); F16C 3/14 (2013.01); F16C 3/18 (2013.01); F16C 9/02 (2013.01);
(Continued)

(58) Field of Classification Search
CPC .......... F04B 9/045; F04B 17/03; F04B 35/04; F04B 39/0094; F04B 39/121;
(Continued)

(56) References Cited

U.S. PATENT DOCUMENTS 2,100,799 A * 11/1937 Drysdale ................. F04B 39/02
310/66
2,138,664 A * 11/1938 Money ................ F04B 27/0428
417/363

(Continued)

FOREIGN PATENT DOCUMENTS

FR 2591285 A3 6/1987

OTHER PUBLICATIONS

International Search Report and Written Opinion, International Application No. PCT/BR2011/000505 dated Apr. 10, 2012.

Primary Examiner — Alexander Comley
(74) Attorney, Agent, or Firm — Dinsmore & Shohl LLP (57) ABSTRACT The arrangement of the present invention is applied to a compressor which comprises a bearing hub housing a crankshaft and presenting at least a first and a second bearing portion, spaced apart by a circumferential recess. The crankshaft presents at least a first and a second support portion, spaced apart by a circumferential recess, which is offset from the circumferential recess of the bearing hub. At least one of the bearing portions and support portions has an axial extension superior to that required for radially bearing the crankshaft, the first and second bearing portions defining, with the first and second support portions, respectively, a first and a second radial bearing regions having the axial extensions required for a radial bearing for the crankshaft, presenting lower loss by viscous friction.

3 Claims, 5 Drawing Sheets (51) Int. Cl.
*F16C 3/18* (2006.01)
*F16C 9/02* (2006.01)
*F16C 33/10* (2006.01)
*F04B 35/04* (2006.01)
*F04B 9/04* (2006.01)
*F04B 17/03* (2006.01)
*F04B 39/02* (2006.01)
*F16C 3/22* (2006.01)

(52) U.S. Cl.
CPC ............ *F16C 33/106* (2013.01); *F04B 9/045* (2013.01); *F04B 17/03* (2013.01); *F04B 35/04* (2013.01); *F04B 39/0246* (2013.01); *F16C 3/22* (2013.01)

(58) Field of Classification Search
CPC .. F04B 39/122; F04B 53/006; F04B 39/0238; F04B 39/0246; F04B 39/0253; F16C 3/14; F16C 3/18; F16C 3/22; F16C 9/02
USPC .................................................. 417/415, 902
See application file for complete search history.

(56) References Cited

U.S. PATENT DOCUMENTS

| | | | | |
|---|---|---|---|---|
| 2,668,004 A * | 2/1954 | Browne | .................. | F04B 27/02 417/265 |
| 3,465,953 A * | 9/1969 | Shaw | ................... | F04B 35/04 417/368 |
| 3,606,594 A * | 9/1971 | Lewis et al. | .......... | F04B 39/127 417/415 |
| 4,181,474 A * | 1/1980 | Shaw | ..................... | F01C 21/02 417/366 |
| 5,118,263 A * | 6/1992 | Fritchman | ........... | F04B 39/0292 184/18 |
| 5,271,247 A * | 12/1993 | Lee | ..................... | F04B 39/0246 417/902 |
| 5,509,790 A * | 4/1996 | Schuderi | ................ | F04B 41/06 417/201 |
| 6,036,454 A * | 3/2000 | Bianchi | ................... | F04B 27/08 417/415 |
| 6,095,768 A * | 8/2000 | Bianchi | ............... | F04B 39/0094 417/372 |
| 6,196,722 B1 | 3/2001 | Asada et al. | | |
| 6,409,481 B1 * | 6/2002 | Brabek | ................... | F04B 35/04 417/312 |
| 6,948,418 B2 * | 9/2005 | Kim | .................... | F04B 39/0253 417/415 |
| 7,137,791 B2 * | 11/2006 | Manke | ................ | F04B 39/0094 417/372 |
| 7,175,400 B2 * | 2/2007 | Collings | ............. | F04B 39/0005 417/571 |
| 7,225,723 B2 * | 6/2007 | Yoon | ................... | F04B 39/0253 417/415 |
| 7,273,355 B2 * | 9/2007 | Collings | ............. | F04B 39/0005 417/53 |

\* cited by examiner

BEARING ARRANGEMENT FOR A RECIPROCATING COMPRESSOR

FIELD OF THE INVENTION

The present invention refers to a constructive arrangement for providing a radial bearing for the crankshaft of a reciprocating refrigeration compressor, either hermetic or not, presenting smaller viscous friction losses in relation to the known bearing arrangements.

PRIOR ART

The refrigeration compressors of the reciprocating type, generally have a mechanical assembly composed by a crankcase, a crankshaft, at least one connecting rod and at least one piston, which elements are arranged so that the rotating movement of the crankshaft, provided by an electric motor of the compressor, is converted to a reciprocating linear movement of the piston.

Figure 1:
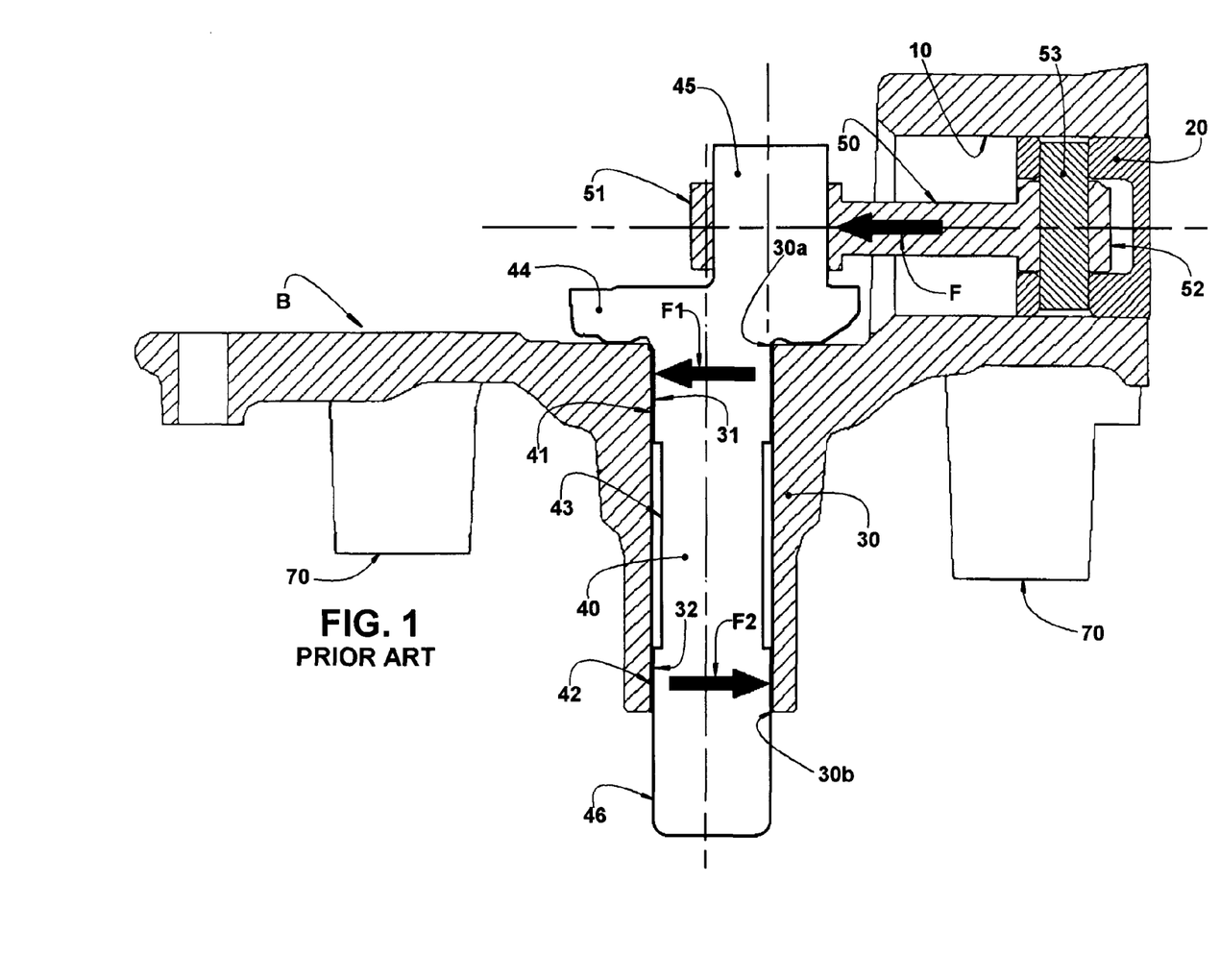
FIG. 1 represents, schematically, a longitudinal sectional view of a crankcase with its bearing hub housing a crankshaft provided with a circumferential recess, disposed between two support end portions, according to a first prior art constructive arrangement.

A conventional construction of a reciprocating compressor, of the type illustrated in FIG. 1, presents, in the interior of a shell (not illustrated), a crankcase B which defines a cylinder 10, inside which reciprocates a piston 20.

The crankcase B is also provided with a bearing hub 30, whose inner surface radially supports a crankshaft 40 which incorporates an eccentric end portion 45, projecting outwardly from a first end 30a of the bearing hub 30 and operatively coupled to the piston 20, by means of a connecting rod 50, and a free end portion 46 which projects outwardly from a second end 30b of the bearing hub 30.

In the present disclosure, the axis of the crankshaft 40 is considered to be coincident with the axis of the bearing hub 30, independently of the operational condition of the compressor.

Around the eccentric end portion 45 of the crankshaft 40, it is mounted a larger eye 51 of the connecting rod 50, whose smaller eye 52 is coupled to the piston 20, by a wrist pin 53. The free end portion 46 of the crankshaft 40, which projects outwards from the bearing hub 30, is coupled to a rotor of an electric motor, not illustrated and which rotates the crankshaft 40, impelling the piston 20. Said free end portion 46 of the crankshaft 40 generally also carries, in this compressor construction, an oil pump not illustrated and which conducts oil from an oil reservoir, defined in a lower portion of the shell, to the compressor parts to be lubricated. The crankcase B generally supports, by an end portion 70, a stator (not illustrated) of the electric motor.

In this known construction, during the compression of the gas in the cylinder 10, the compression force F, which actuates against the eccentric end portion 45 of the crankshaft 40, is transmitted to the crankcase B, by the crankshaft 40, in the first and second end portions 30a, 30b of the bearing hub 30, and on which there are applied a first and a second reaction forces F1, F2, derived from the compression force F.

The forces mentioned above, in the presence of the radial gaps between the crankshaft 40 and the bearing hub 30, inherent to the sliding bearings, produce the so-called misalignment of the crankshaft 40, whereby the two end portions 30a, 30b of the bearing hub 30 are those which support the load imposed to the bearing hub 30, considering an ideal situation of high rigidity of the mechanism components.

Considering the deformable components and the presence of sliding (hydrodynamic) bearings, the reaction forces F1, F2 are distributed in the regions of the end portions 30a, 30b of the bearing hub 30, which regions effectively have the function of radially bearing the crankshaft 40. There is a continuous search for constructive solutions which allow increasing the energy efficiency of these reciprocating refrigeration compressors, one of said solutions providing the reduction of the mechanical losses of the movable components, for example, the mechanical losses generated by the relative movement between the crankshaft 40 and the bearing hub 30, generally as a function of the viscous friction generated by said lubricated parts, upon rotation of the crankshaft 40 in the interior of the bearing hub 30.

The power dissipated, as a function of said viscous friction, is proportional to the axial extension of the radial bearing which supports the crankshaft 40. Thus, it is known the provision of a radial recess in radial bearings of large axial extension, with the object of reducing the mechanical losses by viscous friction.

Although the intermediary portion of the bearing hub 30 little contributes to the hydrodynamic support of the crankshaft 40, it is responsible for a significant part of the viscous friction loss. On account of this fact, it is known in the art the provision of a circumferential recess 43, in the median region of the crankshaft 40, which is positioned between the end portions 30a, 30b of the bearing hub 30, as illustrated in FIG. 1 of the enclosed drawings. With the provision of the circumferential recess 43, the crankshaft 40 presents a first support portion 41, generally close to the eccentric end portion 45, and a second support portion 42, axially spaced from the first one and adjacent to the free end portion 46 of the crankshaft 40.

The first and second support portions 41, 42 of the crankshaft 40 have their axial extensions dimensioned to provide the necessary and adequate hydrodynamic radial bearing of the shaft in relation to respective end portions of the bearing hub 30, which define, respectively, a first and a second bearing portions 31, which, in said prior art construction, present a constant diameter along the whole axial extension of the bearing hub 30. Therefore, in said construction, the bearing hub 30 is not provided with any circumferential recess.

With the solution illustrated in FIG. 1, it is possible to reduce, through the axial dimensioning of the circumferential recess 43, the axial extension of the first and second support portions 41, 42 of the crankshaft 40, that is, of the axial extension of the radial bearing regions between the crankshaft 40 and the bearing hub 30 and, consequently, the levels of mechanical loss by viscous friction. However, the reduction of the axial extension of the first support portion 41 of the crankshaft 40, allied to the unbalance produced by the eccentric end portion 45 and by the cast counterweight 44, incorporated in the median region of the crankshaft 40, impairs the grinding process of the shaft, mainly when produced by the centerless process, tending to increase shape errors (circularity and cylindricity) in the crankshaft 40. The reduction of the useful bearing area and the natural unbalance of the crankshaft 40 make the grinding process of the crankshaft undesirably complex and costly, in case of using grinding processes other than the centerless. It should be noted that the second support portion 42 of the crankshaft 40 is adjacent to the free end portion 46, the latter guaranteeing the axial extension of the second support portion 42 and an adequate support surface in the centerless grinding process of the crankshaft 40.

Figure 2:
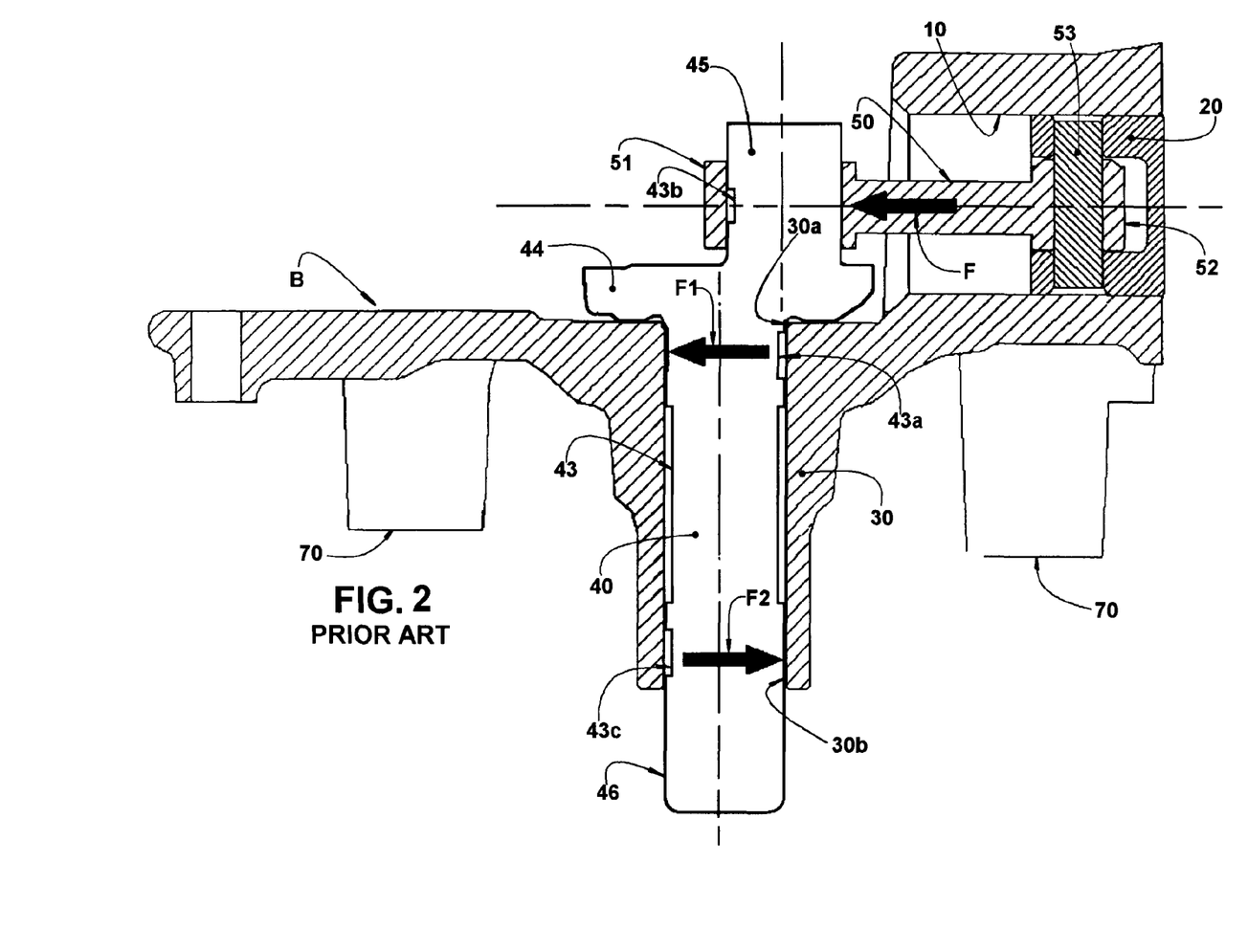
FIG. 2 represents a view similar to that of FIG. 1, but illustrating the crankshaft provided with three partial circumferential recesses, which are positioned in the crankshaft and in its eccentric end portion, but only in the regions less required in terms of radial bearing, according to a second prior art constructive arrangement.

In FIG. 2 of the drawings, it is illustrated the construction described in document WO 03/098044, according to which it is provided not only one circumferential recess 43, in the median region of the crankshaft 40, but also a first, a second and, optionally, a third partial circumferential recesses 43a, 43b and 43c in the bearing regions of the crankshaft 40 and in the eccentric end portion 45, which are submitted to lower loads during the operation of the compressor, that is, in the regions which generate low pressure in the oil film. The first partial circumferential recess 43a is provided in a shaft portion adjacent to the eccentric end portion 45, in a region angularly aligned with the eccentric end portion 45. The second partial circumferential recess 43b is provided in the eccentric end portion 45, in a region angularly and diametrically opposite to the first partial circumferential recess 43a. The third partial circumferential recess 43c, which is optional, is provided in a region of the crankshaft 40, adjacent to the free end portion of the latter and axially aligned with the second partial circumferential recess 43b, provided in the eccentric end portion 45 of the crankshaft 40.

Said second prior art solution presents some inconveniences associated with the production of said partial circumferential recesses 43a, 43b and 43c.

One of the inconveniences results from the fact that the formation of said partial circumferential recesses requires more complex operations, including milling or the use of a cylindrical grinder.

Other negative aspect of said second previous solution results from the fact that the additional reduction of the viscous friction is limited to the region of the partial circumferential recesses 43a, 43b and 43c presenting a small circumferential extension and reduced axial width.

Figure 3:
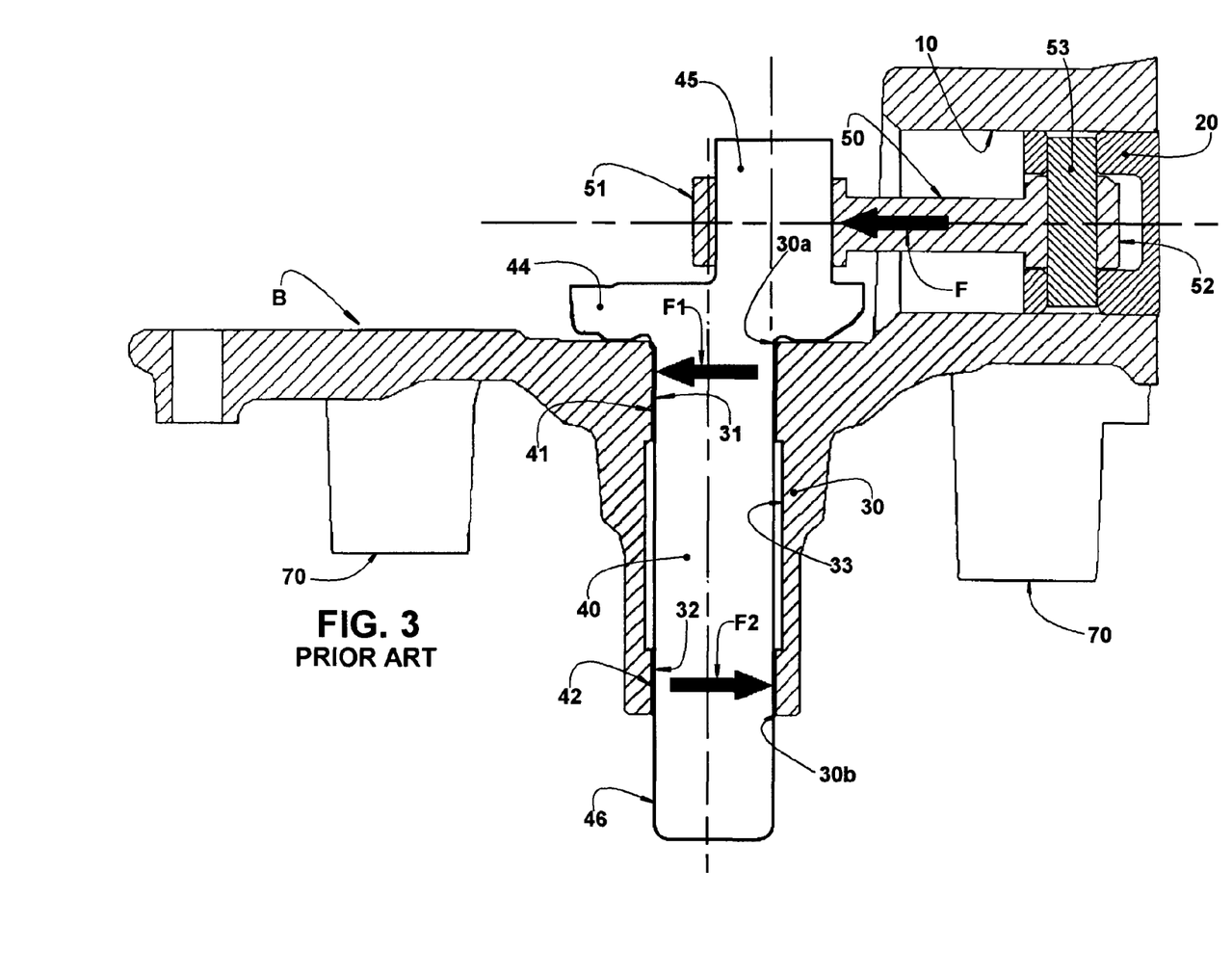
FIG. 3 represents a view similar to that of FIG. 1, but illustrating a crankcase with its bearing hub housing a crankshaft and being provided with a circumferential recess, defined between the first and the second bearing portions, according to a third prior art constructive arrangement.

FIG. 3 illustrates an arrangement described in patent document JP 62-118074 (publication number). In this third prior art solution, the reduction of the viscous friction is obtained by means of a circumferential recess 33, in the inner surface of the bearing hub 30, which defines a first and a second bearing portion 31, 32, in the respective first and second ends 30a, 30b of said bearing hub 30. In this construction, only the bearing hub 30 is configured to provide, with its circumferential recess 33, a reduction in the median region of reduced radial load, reducing the viscous friction between the crankshaft 40 and the bearing hub 30, in a magnitude similar to that of the first solution presented in FIG. 1.

This third known construction has the inconvenience of presenting cylindricity deviations upon using very small axial extensions of the first and the second bearing portions 31, 32. Moreover, the second bearing portion 32 generally presents a minimum axial extension, as a function of the low loads to which it is submitted.

This third construction does not permit obtaining a maximum reduction of the axial extension of the radial bearing regions and, consequently, of the viscous friction. Therefore, it is more advantageous and usual to use the first solution, presented in FIG. 1, with the first and the second support portion 41, 42 of the crankshaft 40 presenting an axial extension sufficient to guarantee simple and reliable grinding operations for the crankshaft 40.

SUMMARY OF THE INVENTION

In the face of the inconveniences of the known constructive solutions, the present invention has the object of providing a bearing arrangement for a reciprocating refrigeration compressor, of the type discussed above, which allows minimizing the power dissipated by viscous friction between the crankshaft and the bearing hub, maintaining the surfaces of the crankshaft and bearing hub reliable and adequate to more simple surface finishing operations as, for example, grinding, superfinishing and burnishing processes.

The present bearing arrangement is applied to a compressor of the type commented above and which includes a crankcase defining a bearing hub, in which is housed a crankshaft incorporating an end portion, projecting outwards from a first end of the bearing hub, and a free end portion, projecting outwards from a second end of the bearing hub.

According to the invention, the bearing hub comprises a first and a second bearing portion, spaced from each other by a circumferential recess, the crankshaft comprising a first and a second support portion, spaced from each other by a circumferential recess which is axially offset in relation to the circumferential recess of the bearing hub.

The bearing and support portions present axial extensions superior to those required for axially bearing the crankshaft, part of the axial extension of the first support portion and of the second bearing portion defining, with a confronting axial extension of the first bearing portion and of the second support portion, respectively, a first and a second radial bearing region for the crankshaft.

Considering the present bearing arrangement as being applied to reciprocating compressors, for small household and commercial refrigeration systems, with the crankshaft presenting diameters smaller than 21.0 millimeters, said radial bearing regions are dimensioned to present a radial gap of about 5.0-15.0 micrometers.

The construction proposed by the invention allows obtaining, simultaneously, radial bearing regions, with axial dimensions relatively reduced in relation to the known constructions, achieving minimum values of viscous dissipation (mechanical loss), with the support and bearing portions presenting axial extensions sufficient for the surface finishing operations of the shaft and of the bearing hub.

BRIEF DESCRIPTION OF THE DRAWINGS

The invention will be described below, with reference to the enclosed drawings, given by way of example and in which.

DETAILED DESCRIPTION OF THE INVENTION

As already previously described, the bearing arrangement of the present invention is applied to a refrigeration compressor of the type partially illustrated in the enclosed drawings and which includes, in the interior of a shell (not illustrated), a crankcase B which comprises cylinder 10, at least, and one bearing hub 30 having a first end 30a and a second end 30b.

The bearing hub 30 houses a crankshaft 40 which incorporates an eccentric end portion 45, projecting axially outwards from the first end 30a of the bearing hub 30, and a free end portion 46, which projects axially outwards from the second end 30b of the bearing hub 30. Although FIGS. 4 and 5 do not illustrate the cylinder, the piston and the connecting rod, it should be understood that such parts were suppressed only by reasons of simplification of said figures, since they are already part of the type of compressor to which the present bearing arrangement is applied.

The parts of crankcase B and crankshaft 40 can be constructed in any adequate well known prior art material as, for example, aluminum or cast iron alloys for the crankcase B, and steel or cast iron alloys for the crankshaft 40.

Figure 4:
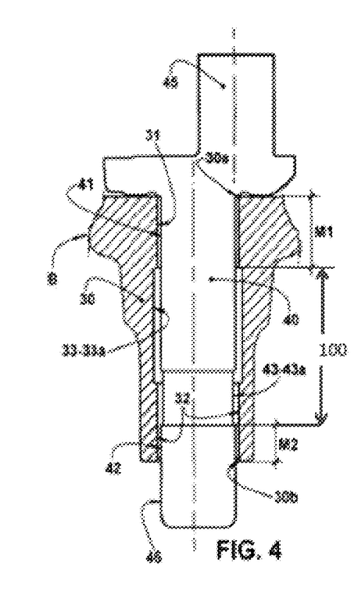
FIG. 4 represents a view similar to that of FIGS. 1 and 3, but illustrating the same compressor crankcase, partially cut and having its bearing hub and the respective crankshaft provided with respective circumferential recesses, formed according to a first embodiment of the present invention.

As illustrated in FIG. 4 of the enclosed drawings, the present bearing arrangement includes a bearing hub 30 which comprises a first bearing portion 31 and a second bearing portion 32, axially spaced from each other by a circumferential recess 33, which is provided around the median region of the bearing hub 30.

The circumferential recess 33 should present a radial depth only sufficient to prevent its bottom cylindrical face 33a from having any bearing function, that is, from producing losses by viscous friction jointly with the confronting surface of the crankshaft 40. However, said radial depth should not reach values which can impair the adequate lubrication of any of the regions of the bearing hub 30 in which the effective bearing of the crankshaft 40 occurs, as described ahead.

In like manner, the crankshaft 40 comprises a first support portion 41 and a second support portion 42, which are spaced from each other by a circumferential recess 43, provided around the median region of the crankshaft 40 and whose radial depth is defined in a manner only sufficient to prevent its bottom cylindrical face 43a from having any bearing function, that is, from producing losses by viscous friction jointly with the confronting surface of the bearing hub 30. However, as already mentioned above, said radial depth must not reach values which can impair the adequate lubrication of any of the regions in which the effective bearing of the crankshaft 40 occurs.

In the refrigeration compressors considered in the present invention, the radial depth of the circumferential recesses 33, 43 is preferably defined between about 0.03 and 0.10 millimeters.

According to the present invention, the first and second bearing portions 31, 32 of the bearing hub 30, and the first and second support portions 41, 42 of the crankshaft 40 present respective axial extensions, which are predetermined to guarantee the formation, on the bearing hub 30 and in the crankshaft 40, of support surfaces for effecting the surface finishing operations required for the support portions 41, 42 of the crankshaft 40 and for the bearing portions 31, 32 of the bearing hub 30.

As already commented in relation to the prior art, in case the bearing portions 31, 32 of the bearing hub 30, or the support portions 41, 42 of the crankshaft 40, have their axial extensions individually reduced to minimum values, but still capable of guaranteeing an adequate radial bearing of the crankshaft 40, said reduced bearing portions 31, 32 and support portions 41, 42 will not be capable of providing surface extensions which allow simple, reliable and relatively uncostly surface finishing operations of the bearing hub 30 and of the crankshaft 40.

A particular aspect of the present invention refers to the determination of the axial extension of said bearing portions 31, 32 and support portions 41, 42, since this dimensioning is made independently of the axial extensions required for the radial bearing regions of the crankshaft 40 which are formed by the radially confronting axial extensions of said support portions 41, 42 of the crankshaft 40 and of the bearing portions 31, 31 of the bearing hub 30.

Further according to the present invention and as illustrated in FIG. 4, the circumferential recesses 33, 43, of the bearing hub 30 and of the crankshaft 40, respectively, are axially and partially offset from each other and also axially dimensioned so that the first and second bearing portions 31, 32 of the bearing hub 30, define, respectively, with the first and second support portions 41, 42 of the crankshaft 40 a cooperative recess 100:
- a first radial bearing region M1, having an axial extension equal to the axial extension of the first bearing portion 31 and smaller than the axial extension of the first support portion 41; and
- a second radial bearing region M2, having an axial extension smaller than the axial extensions of the second bearing portion 32, and of the second support portion 42 (which defines the free end portion 46).

As can be noted, the bearing arrangement proposed by the present invention allows the first and second radial bearing regions M1, M2 to be dimensioned in the axial direction, considering only the bearing requirements for the crankshaft 40, without said axial dimensioning, which is reduced in the radial bearing regions M1, M2 and capable of minimizing the losses by viscous friction in the operation of the crankshaft 40, undesirably reducing the axial extensions of the bearing portions 31, 32 and support portions 41, 42 and, thus, impairing the surface finishing operations of the bearing hub 30 and of the crankshaft 40.

According to the proposed arrangement, the axial dimensioning of the first and second radial bearing regions M1, M2 is made so as not to interfere, at least in a relevant manner, with the axial dimensioning of the bearing portions 31,32 and of the support portions 41,42. Thus, it is possible, with the present invention, to provide the first and second radial bearing regions M1, M2 with dimensions that are relatively reduced in relation to those required in the prior art solutions.

In the shaft construction illustrated in the enclosed drawings, the second support portion 42, of the crankshaft 40, extends through the free end portion 46 of the latter, allowing the axial extension of the second radial bearing region M2 to be defined only by determination of the positioning of the adjacent end of the circumferential recess 43 of the crankshaft 40. It should be noted that the free end portion 46 of the crankshaft 40 guarantees an adequate axial extension for the second support portion 42 of the crankshaft 40, even though said portion projects only slightly inwardly the bearing hub 30, so as to define therein the second radial bearing region M2, with an axial extension which is very reduced due to the smaller load to which this second radial bearing region is submitted upon the compressor operation.

Further according to the enclosed drawings, the first and the second bearing portions 31, 32 are respectively positioned adjacent to the first and second ends 30a, 30b of the bearing hub 30. Thus, the axial extensions of the first and second radial bearing regions M1, M2 are limited by the ends of the circumferential recesses 33, 43, respectively provided in the bearing hub 30 and in the crankshaft 40.

In the construction illustrated in FIG. 4, the circumferential recess 43 of the crankshaft 40 is made so as to provide a first support portion 41 with an axial extension superior to that required for the respective radial bearing region M1. This radial bearing region M1 is defined by the minimum axial extension required for the first bearing portion 31 necessary for an adequate and reliable surface finishing operation of the bearing hub 30. In this case, the axial extension of the first radial bearing region M1 can be over-dimensioned in relation to the value required for an adequate bearing of the crankshaft 40, the priority of said dimensioning being determined by the minimum extension required for the first bearing portion 31, as a function of the requirements of the surface finishing process of the bearing hub 30.

Figure 5:
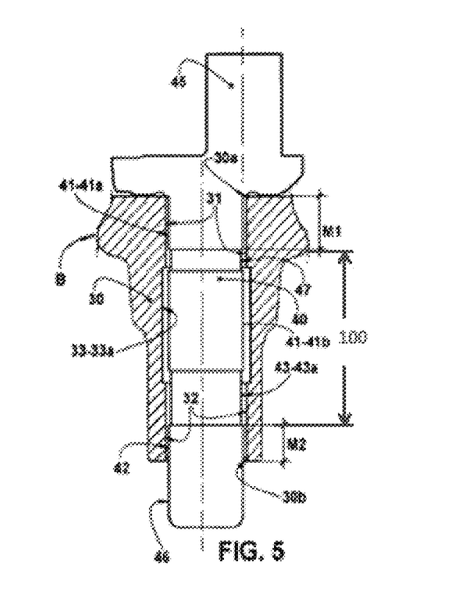
FIG. 5 represents a view similar to that of FIG. 4, but illustrating the crankshaft and the bearing hub provided with respective circumferential recesses, formed according to a second embodiment of the present invention.

However, as illustrated in the embodiment of FIG. 5, the first support portion 41 of the crankshaft 40 can be provided with at least one relief circumferential recess 47, which is at least partially confronting with a respective axial extension of the first bearing portion 31. Thus, this relief circumferential recess 47, which confronts an extension of the first bearing portion 31, diminishes the axial extension of the first radial bearing region M1, reducing it to the minimum values required for the provision of an adequate radial bearing region for the crankshaft, reducing to the minimum the energy losses by viscous friction, maintaining the entire axial extension of the first support portion 41, which is thus composed by a first axial extension 41a and a second axial extension 41b, with an adequate dimensioning for a correct and reliable grinding operation of the crankshaft 40.

As illustrated in FIG. 5, the relief circumferential recess 47 is provided in a median region of the first support portion 41 of the crankshaft 40, and confronting with a respective axial extension of the first bearing portion 31, adjacent to the circumferential recess 33 of the bearing hub 30. Circumferential recesses 47, 33 and 43 define a cooperative recess 100.

The positioning of the relief circumferential recess 47, in a median region of the first support portion 41 and confronting with the first bearing portion 31, allows the extension of the first radial bearing region M1 to be defined by subtracting the axial extension portion of said relief circumferential recess 47 which confronts the first bearing portion 31, without causing decrease in the whole axial extension of the first support portion 41.

It should be noted that the radial depth of the relief circumferential recess 47 is dimensioned according to the same criteria already commented in relation to the dimensioning of the radial depth of the other circumferential recesses 33, 43 of the bearing hub 30 and of the crankshaft 40.

Figure 6:
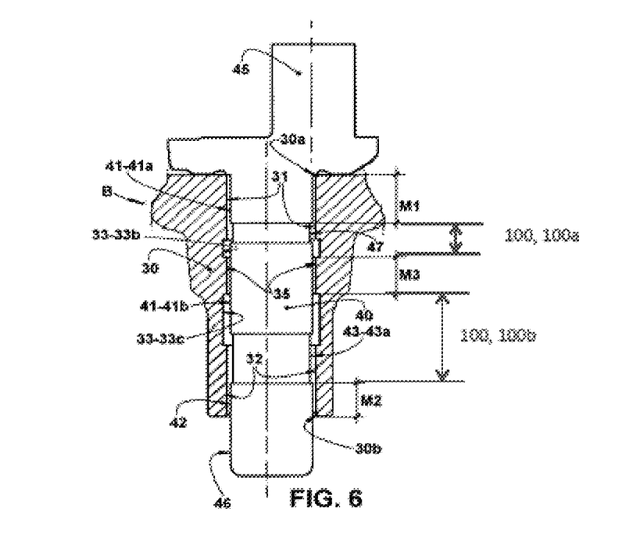
FIG. 6 represents a view similar to that of FIG. 5, but illustrating the crankshaft and the bearing hub provided with respective circumferential recesses and defining, besides the first and the second radial bearing regions, a third radial bearing region, intermediary to the first two, according to a third embodiment of the present invention.

As illustrated in FIG. 6 of the enclosed drawings, the bearing hub 30 can have its circumferential recess 33 defined by at least two recess portions 33b, 33c, which are separated apart by a third bearing portion 35, radially confronting with the first support portion 41 (according to the embodiment of FIG. 4) or with the second axial extension 41b of the first support portion 41 (according to the embodiment of FIG. 5), in order to define, with said first support portion 41 or second axial extension 41b, a third radial bearing region M3, disposed between the first and the second radial bearing region M1, M2. Recess portion 33b and the relief circumferential recess 47 define a first cooperative recess 100a, while recess portion 33c and circumferential recess 43 define a second cooperative recess 100b, the totality of the first and second cooperative recesses 100a, 100b defining the cooperative recess 100.

The third radial bearing region M3 occupies a positioning intermediate to the first and second radial bearing regions M1, M2, allowing to improve the alignment of the crankshaft 40 in its lower end (region of the rotor), so as to provide a rotor operation which is more centralized in relation to the hole of the stator.

Thus, even though the provision of the third radial bearing region M3 causes an increase in the sum of the axial extensions of the multiple radial bearing regions, in relation to the sum of the axial extensions of only two radial bearing regions, said provision will be determined as a function of the project features of the compressor, mainly of the levels of deformation of the shaft, and/or of the diametrical gap values used in the project.

If it is necessary or convenient to provide a higher bearing degree for the crankshaft 40, the constructive solution, suggested in FIG. 6 of the drawings, allows complying with the requirement for a greater extension for the radial bearing, maintaining the sum of the axial extensions of the multiple bearing regions in values which are reduced in relation to the solutions suggested by the prior art.

It should be understood that the circumferential recess 33 of the bearing hub 30 may be defined by more than two recess portions, which are separated apart by bearing portions. The number of circumferential recesses, provided in the crankshaft 40 and in the bearing hub 30, can vary according to the project features of the compressor and, more specifically, according to the bearing requirements for the crankshaft.

It should be noted that the radial depth of the recess portions 33b, 33c is dimensioned according to the same criteria already commented in relation to the dimensioning of the radial depth of the other circumferential recesses 33, 43 and 47 of the bearing hub 30 and of the crankshaft 40.

While only some embodiments for the present invention have been described herein with reference to the embodiments of the enclosed drawings, it should be understood that other possible constructions can be presented, without departing from the inventive concept defined in the claims that accompany the present specification.

The invention claimed is:

1. A bearing arrangement for a reciprocating refrigeration compressor of the type which includes a crankcase defining a bearing hub, in which is housed a crankshaft, the crankshaft having an axial length extending along a length of the bearing hub, the crankshaft incorporating an eccentric end portion, projecting outwardly from a first end of the bearing hub, and a free end portion, projecting outwardly from a second end of the bearing hub, said arrangement being characterized in that the bearing hub comprises a first and a second bearing portion, spaced apart by a first circumferential recess having a first length defined by the axial length of the crankshaft, the crankshaft comprising a first and a second support portion, spaced apart by a second circumferential recess having a second length defined by the axial length of the crankshaft axially offset in relation to the first circumferential recess of the bearing hub, wherein, the first circumferential recess and second circumferential recess share a common wall of the bearing hub in order to define a cooperative recess having a third length defined by the axial length of the crankshaft, the cooperative recess having a greater length than the individual lengths of either the first length or the second length of the respective first circumferential recess and second circumferential recess, and wherein a first radial bearing region has an axial extension equal to an axial extension of the first bearing portion and smaller than an axial extension of the first support portion, and a second radial bearing region has an axial extension smaller than axial extensions of the second bearing portion and of the second support portion.

2. The bearing arrangement, as set forth in claim 1, characterized in that the second support portion of the crankshaft includes the free end portion of the latter.

3. The bearing arrangement, as set forth in claim 1, characterized in that the first and second bearing portions are adjacent to the first and second ends, respectively, of the bearing hub.

* * * * *